United States Patent Office 2,716,643
Patented Aug. 30, 1955

2,716,643

HYDROXYLATED RESINS FROM POLYVINYL CHLORIDE

John Daniel Cotman, Jr., Springfield, Mass., assignor to Monsanto Chemical Company, St. Louis, Mo., a corporation of Delaware No Drawing. Application September 12, 1952,
Serial No. 309,387

4 Claims. (Cl. 260—92.8)

This invention relates to polymeric materials containing carbon, hydrogen, chlorine and oxygen. More particularly the invention relates to a process for replacing the greater part of chlorine in polyvinyl chloride with hydrogen and hydroxyl groups.

Vinyl chloride is readily polymerized and copolymerized to yield products of relatively high molecular weight. The polymers are fairly hard materials which frequently must be plasticized for efficient manipulation. They also have a disadvantage that they are relatively unstable to heat and light.

Vinyl chloride being easy to make and polymerize, it would be advantageous to discover a process for modifying the polymer to provide products having different and particular properties and which would be stable to heat and light.

One object of this invention is to provide long chain polymeric materials containing carbon, hydrogen, chlorine and oxygen.

A further object is to provide a process for preparing long chain polymeric materials containing carbon, hydrogen, chlorine and oxygen.

Another object is to provide a process for replacing the chlorine in ponlyvinyl chloride with hydrogen and hydroxyl groups.

These and other objects are attained by reacting polyvinyl chloride with lithium aluminum hydride in an anhydrous medium in the presence of oxygen.

The following examples are given in illustration and are not intended as limitations on the scope of this invention. Where parts are mentioned they are parts by weight.

*Example I*

Dissolve 10 parts of lithium aluminum hydride and 5 parts of polyvinyl chloride having a degree of polymerization of about 1400 in 600 parts of anhydrous tetrahydrofuran. Heat the solution at reflux temperature and atmospheric pressure about 8 hours. Allow the solution to cool so that the surface of the reaction medium is exposed to air. Repeat the heating and cooling cycle until the total heating period is approximately 310 hours. Cool the reaction medium, add cold water to destroy excess lithium aluminum hydride and dilute nitric acid to dissolve basic aluminum salts. Filter and wash the filter cake with water to remove adsorbed salts. The product is an amorphous polymer containing less than 3% of the original chlorine groups and about one hydroxyl group for every 20 to 25 carbon atoms. Infrared spectrum analysis shows that the polymer is saturated i. e. contains no unsaturated linkages due to the removal of chlorine on adjacent carbon atoms followed by formation of a double bond.

The product is thermoplastic and may be molded under heat and pressure. It has particularly high adhesion to glass and metal and is stable to accelerated weathering.

The product may be esterified by reaction with acyl chlorides to provide a polymer having ester groups randomly distributed on the chain. The esterification may be regulated so that part or all of the hydroxyl groups are reacted as desired. For example, by slurring the product and an excess of benzoyl chloride in pyridine and heating the slurry to about 80° C. for 2 hours, a benzoyl ester is obtained in which substantially all of the hydroxyl groups have been esterified. By using smaller amounts benzoyl chloride, partial esters can be produced.

*Example II*

Dissolve 0.5 part of lithium aluminum hydride and 5 parts of polyvinyl chloride having a degree of polymerization of about 1400 in 300 parts of anhydrous tetrahydrofuran and add 2 parts of lithium hydride to the solution. Heat the solution at reflux temperature and atmospheric pressure for about 14 hours. During the reaction, bubble oxygen into the reaction medium slowly through a fine capillary unitil about 0.2 mol of oxygen has been added per mol of polyvinyl chloride. Then cool the reaction mixture and purify the product. Infrared spectrum analysis shows the product to be a saturated polymer containing chlorine and hydroxyl groups, the latter being present in the ratio of 1 hydroxyl group to about 30 carbon atoms. Chemical analysis shows a 46 weight percent chlorine content equivalent to a replacement of about 30% of the original chlorine atoms by hydrogen and hydroxyl groups. The product is a fairly hard amorphous thermoplastic material having unusually high adhesion to glass and metals.

The process of this invention should be carried out in an anhydrous medium in the presence of small amounts of oxygen. The oxygen may be provided by stopping the reaction one or more times anl allowing air to flow over the surface of the reaction medium, by conducting the reaction at temperatures far enough below the reflux temperature so that substantial amounts of oxygen come in contact with the surface of the reaction medium or by adding air or oxygen beneath the surface of the reaction medium through a capillary. The amount of oxygen should be limited to from 0.05 to 0.5 mol per mol of polymer. If the oxygen is introduced into the reaction medium it should be introduced slowly over the entire reaction peroiod. Large amounts of oxygen destroy the efficiency of the lithium aluminum hydride and may stop the reaction altogether. By careful regulation of the amount and rate of addition of the oxygen, products may be obtained having 1 hydroxyl group for every 15 to 35 carbon atoms as desired.

The reaction medium should be a solvent for both the polyvinyl chloride and the lithium aluminum hydride. Furthermore the reaction medium should be inert to all of the reactants. Ethers as a general class are at least partial solvents for and unreactive towards both polyvinyl chloride and the reducing agents. Tetrahydrofuran is by far the best of the ether solvents since the polymers and the lithium aluminum hydride are quite soluble therein and unreactive therewith. Dioxane is the only other ether which is an effective solvent for the polymers of this invention. Since it is only a fair solvent for lithium aluminum hydride it is preferred to mix it with a substantial proportion of a dialkyl ether such as diethyl ether which is an excellent solvent for the hydride. Mixtures of dioxane and tetrahydrofuran or of tetrahydrofuran and other acyclic or alicyclic aliphatic ethers may be used.

The primary reducing agent is lithium aluminum hydride. It is efficient when used as the sole reducing agent. It is convenient to use a small amount of lithium aluminum hydride in conjunction with a larger amount of lithium hydride since the lithium hydride even though it is relatively insoluble in the solvent, serves to reform the lithium aluminum hydride as the latter is consumed by the reaction. In other words, with lithium hydride present, lithium aluminum hydride is formed in situ from the residues of the reducing reaction. The amount of lithium aluminum hydride may be varied according to the product desired. As little as 50 parts per 100 parts of polyvinyl chloride will efficiently substitute hydrogen for about 50% of the chlorine of the polymer. For best results about 100 parts of reducing agent should be used per 100 parts of polyvinyl chloride and, if desired, an excess of reducing agent may be used.

The degree of reducing action is governed partly by the amount of reducing agent, partly by the temperature and partly by the duration of the reaction. It is convenient to carry out the reaction at reflux temperature and atmospheric pressure. Temperatures lower than reflux temperature (boiling point of tetrahydrofuran is about 65° C.) may be used providing care is used to eliminate all but the desired amount of oxygen. At temperatures below 40° C., the reaction becomes quite sluggish. Much more rapid reaction may be obtained at temperatures up to 150° C. providing the reaction is conducted under suitably increased pressure.

The duration of the reaction has particular influence on the removal of the last 50% of the chlorine atoms. In from 8 to 14 hours at reflux temperature, nearly 50% of the chlorine is removed. In order to remove the remainder of the chlorine, it is necessary to extend the reaction for periods up to 350 hours to remove all but the last traces of chlorine.

After the reaction is completed, water is added to the reaction medium. This serves to precipitate the polymer and destroy any excess reducing agent by reaction therewith. Basic aluminum salts which form during the reaction are dissolved by treatment with dilute acid. The polymer is then recovered by filtration and further freed from adsorbed salts by washing with water. Finally the polymer is dried at temperatures up to 100° C.

Attempts to carry out the reaction using other well-known reducing agents such as sodium amalgam and alcohol produce cross-linked products which contain scattered unsaturated linkages. Such products are air sensitive and have poor molding properties.

The polymers which may be reduced by the process of this invention are homopolymers of vinyl chloride, vinylidene chloride and copolymers of vinyl chloride with vinylidene chloride. The polymers should have a degree of polymerization in excess of 100. Products obtained from the polymers having a degree of polymerization between 100 and 500 are particularly valuable as adhesives. Products having higher degree of polymerization are advantageous for sheets for laminated glass and for packaging materials where exceptional heat sealability is required.

It is obvious that variations may be made in the products and processes of this invention without departing from the spirit and scope thereof as defined in the appended claims.

What is claimed is:

1. A saturated thermoplastic polymeric material consisting of a multiple carbon to carbon chain and containing only carbon, hydrogen, chlorine and oxygen atoms, said oxygen being present as part of a hydroxyl group and said chlorine atoms and hydroxyl groups being randomly distributed on the carbon to carbon chain, said material having been prepared by reacting a homopolymer of vinyl chloride with lithium aluminum hydride in the presence of from 0.05 to 0.5 mol of oxygen per mol of homopolymer, said reaction having been carried out in solution in an anhydrous ether.

2. A process as in claim 4 wherein the solvent is tetrahydrofuran.

3. A process as in claim 4 wherein part of the lithium aluminum hydride is replaced by lithium hydride.

4. A process which comprises reacting a homopolymer of vinyl chloride with lithium aluminum hydride in the presence of from 0.05 to 0.5 mol of oxygen per mol of homopolymer, said reaction being carried out in solution in an anhydrous ether.

References Cited in the file of this patent

UNITED STATES PATENTS 2,399,653  Roland _____ May 7, 1946